US012742101B2

(12) United States Patent
Chang et al.

(10) Patent No.: US 12,742,101 B2
(45) Date of Patent: Sep. 22, 2026

(54) PHOTOCURABLE PRESSURE-SENSITIVE ADHESIVE COMPOSITION FOR ELECTRICAL COMPONENTS WITH THREE-DIMENSIONAL STRUCTURE

(71) Applicant: HYUNDAI MOBIS CO., LTD., Seoul (KR)

(72) Inventors: Jae Joon Chang, Yongin-si (KR); Hyeon Don Kim, Yongin-si (KR); Eun Chang Lee, Yongin-si (KR); Jae Min Lee, Yongin-si (KR); Byeong Chan Song, Chilgok-gun (KR); Hyun Lee, Asan-si (KR); Tae Won Hwang, Cheonan-si (KR); So Yeon Lim, Cheonan-si (KR)

(73) Assignees: HYUNDAI MOBIS CO., LTD., Seoul (KR); Sonid Inc., Cheonan-si (KR)

( * ) Notice: Subject to any disclaimer, the term of this patent is extended or adjusted under 35 U.S.C. 154(b) by 397 days.

(21) Appl. No.: 18/235,528

(22) Filed: Aug. 18, 2023

(65) Prior Publication Data

US 2024/0174898 A1 May 30, 2024

(30) Foreign Application Priority Data

Nov. 24, 2022 (KR) ........................ 10-2022-0159387

(51) Int. Cl.
*B32B 7/12* (2006.01)
*C09J 4/00* (2006.01)
(Continued)

(52) U.S. Cl.
CPC ................. *C09J 7/385* (2018.01); *C09J 4/00* (2013.01); *C09J 7/10* (2018.01); *C09J 11/06* (2013.01);
(Continued)

(58) Field of Classification Search
CPC ......... B32B 7/12; C09J 7/10; C09J 2301/302; C09J 2301/312; C09J 2301/404; C09J 2301/418
See application file for complete search history.

(56) References Cited

U.S. PATENT DOCUMENTS

2016/0215181 A1* 7/2016 Fujita ..................... C09J 139/06

FOREIGN PATENT DOCUMENTS

CN 106398554 A * 2/2017 ................ C09J 4/00
CN 113416518 A * 9/2021 ............ C09J 175/16
(Continued)

OTHER PUBLICATIONS

Translation KR 20200131023 A (Year: 2020).*
Translation WO-2015098308 (Year: 2015).*
Translation CN-113416518-A (Year: 2021).*

*Primary Examiner* — Hoa (Holly) Le
(74) *Attorney, Agent, or Firm* — MORGAN, LEWIS & BOCKIUS LLP

(57) ABSTRACT

The present invention relates to a functional pressure-sensitive composition having high heat resistance and bending resistance characteristics, including: 40 to 55 wt % of a urethane acrylate oligomer, 30 to 44 wt % of an acrylate monomer, 2 to 5 wt % of a photoinitiator, 0.2 to 2 wt % of a silane coupling agent, 0.1 to 1 wt % of a light stabilizer, 0.1 to 1 wt % of an ultraviolet absorber and 0.1 to 1 wt % of an antioxidant, and an electrical component with a 3D structure using the same.

20 Claims, 1 Drawing Sheet

| Classification (MS and malicious verification) | Initial | Heat resistance 120℃ 168Hr | Moisture resistance 50℃/95%rh/ 168Hr | Thermal shock -40℃~85℃ 500 cycles | GM cycle D/S |
|---|---|---|---|---|---|
| Color difference(△E) | - | 0.89 | 0.21 | 0.28 | 0.36 |
| Transmittance / Haze(%) | 87.6 / 1.6 | 87.0 / 1.8 | 87.2 / 1.7 | 87.3 / 1.7 | 87.5 / 1.5 |
| Appearance | - | No abnormalities | No abnormalities | No abnormalities | No abnormalities |
| Results | - | OK | OK | OK | OK |
| | - | | | | |

(51) Int. Cl.
*C09J 7/10* (2018.01)
*C09J 7/38* (2018.01)
*C09J 11/06* (2006.01)

(52) U.S. Cl.
CPC .... *C09J 2203/326* (2013.01); *C09J 2301/302* (2020.08); *C09J 2301/408* (2020.08); *C09J 2301/414* (2020.08); *C09J 2301/416* (2020.08); *C09J 2433/00* (2013.01)

(56) References Cited

FOREIGN PATENT DOCUMENTS

| | | | | | |
|---|---|---|---|---|---|
| JP | 4823436 | B2 | * | 11/2011 | |
| KR | 20200131023 | A | * | 11/2020 | ................ C09J 7/22 |
| KR | 20230057442 | A | * | 4/2023 | ........... H10H 20/854 |
| WO | WO-2015098308 | A1 | * | 7/2015 | ................ C09J 7/20 |

* cited by examiner

| Classification (MS and malicious verification) | Initial | Heat resistance 120℃ 168Hr | Moisture resistance 50℃/95%rh/ 168Hr | Thermal shock -40℃↔85℃ 500 cycles | GM cycle D/S |
|---|---|---|---|---|---|
| Color difference (△E) | - | 0.89 | 0.21 | 0.28 | 0.36 |
| Transmittance / Haze (%) | 87.6 / 1.6 | 87.0 / 1.8 | 87.2 / 1.7 | 87.3 / 1.7 | 87.5 / 1.5 |
| Appearance | - | No abnormalities | No abnormalities | No abnormalities | No abnormalities |
| Results | - | OK | OK | OK | OK |
| | - | | | | |

PHOTOCURABLE PRESSURE-SENSITIVE ADHESIVE COMPOSITION FOR ELECTRICAL COMPONENTS WITH THREE-DIMENSIONAL STRUCTURE

CROSS-REFERENCE TO RELATED APPLICATION

This application claims priority to and the benefit of Korean Patent Application No. 10-2022-0159387, filed on Nov. 24, 2022, the disclosure of which is incorporated herein by reference in its entirety.

BACKGROUND

1. Field of the Invention

The present invention relates to a functional pressure-sensitive adhesive composition having high heat resistance and bending resistance characteristics for electrical components with a 3D structure and an electrical component using the same.

2. Discussion of Related Art

A center information display (CID) for vehicles is gradually increasing to 10 inches or more as a front monitor and touch control device, and a curved shape is applied for design. Further, a clear screen is provided through optical bonding.

A pressure-sensitive adhesive applied thereto joins a CID and a display panel in the CID. In the case of optical clear adhesive (OCA) films, it is difficult to control bubbles and shapes during joining due to the flexibility of the CID.

In addition, in the case of electrical components for vehicles, various environmental resistance tests such as high temperature, low temperature, and high humidity are conducted. Therefore, pressure-sensitive adhesives applied to electrical components should not cause turbidity, yellowing, and the like in various environmental reliability evaluations.

Accordingly, there is a need for the development of an optical pressure-sensitive adhesive material in which a shape and form can be deformed and transparency can be maintained in various environments.

SUMMARY OF THE INVENTION

An object of the present invention is to provide a photocurable optical clear pressure-sensitive adhesive composition which has durability and bending resistance as well as excellent transparency even in harsh environments (high temperature, high humidity, and thermal shock) for vehicle display applications.

Another object of the present invention is to provide an electrical component to which a photocurable optical clear adhesive composition having excellent properties is applied, which improves the performance of an automobile accordingly.

An aspect of the present invention provides a photocurable pressure-sensitive adhesive composition for electrical components with a 3D structure, including: 40 to 55 wt % of a urethane acrylate oligomer, 30 to 44 wt % of an acrylate monomer, 2 to 5 wt % of a photoinitiator, 0.2 to 2 wt % of a silane coupling agent, 0.1 to 1 wt % of a light stabilizer, 0.1 to 1 wt % of an ultraviolet absorber, and 0.1 to 1 wt % of an antioxidant.

According to exemplary embodiments, the photocurable pressure-sensitive composition may have a viscosity in a range of 100 to 3,000 cPs.

According to exemplary embodiments, the urethane acrylate oligomer has two or more functional groups using polyol, isocyanate, and hydroxyacrylate, and may have a number average molecular weight in a range of 6,000 to 50,000, preferably 8,000 to less than 20,000.

According to exemplary embodiments, the acrylate monomer may be one or more selected from the group consisting of isobornyl acrylate, 2-hydroxyethyl acrylate, 2-(2-ethoxyethoxy)ethyl acrylate, pentaerythritol tetraacrylate, trimethylolpropane triacrylate, and 1,6-hexanediol diacrylate, but is not particularly limited thereto.

According to exemplary embodiments, the photoinitiator may be one or more selected from the group consisting of 2-hydroxy-2-methyl-1-phenyl-1-propanone, phosphine oxide, phenylbis(2,4,6-trimethylbenzoyl), 4,4'-bis(diethylamino)benzophenone, and diphenyl(2,4,6-trimethylbenzoyl)-phosphine oxide, but is not particularly limited thereto.

According to exemplary embodiments, the silane coupling agent may be one or more selected from the group consisting of vinyltriethoxysilane, methacryloxypropyltrimethoxysilane, aminopropyltriethoxysilane, and mercaptopropyltrimethoxysilane, but is not particularly limited thereto.

According to exemplary embodiments, the light stabilizer may be one or more selected from the group consisting of consisting of bis(1,2,2,6,6-pentamethyl-4-piperidyl) sebacate, methyl 1,2,2,6,6-pentamethyl-4-piperidyl sebacate, and tetramethylpiperidine, but is not particularly limited thereto.

According to exemplary embodiments, one or more of a hydroxybenzophenone-based compounds and a benzotriazole-based compound can be used as the ultraviolet absorber, and for example, the ultraviolet absorber may be one or more selected from the group consisting of 3-(2H-benzotriazolyl)-5-(1,1-dimethylethyl)-4-hydroxy-benzenepropanoic acid octyl ester and b-[3-(2-H-benzotriazol-2-yl)-4-hydroxy-5-tert-butylphenyl]-propionic acid poly(ethylene glycol) 300-ester, but is not particularly limited thereto.

According to exemplary embodiment, the antioxidant may be one or more selected from the group consisting of bis(2,6-diisopropylphenyl)carbodiimide, poly-(1,3,5-triisopropylphenylene-2,4-carbodiimide), octadecyl-3-[3,5-di-tert-butyl-4-hydroxyphenyl]propionate, and 2-methyl-4,6-bis(octylsulfanylmethyl)phenol, but is not particularly limited thereto.

An aspect of the present invention provides an electrical component with a 3D structure including a pressure-sensitive adhesive layer including a photocured product of the photocurable pressure-sensitive composition.

According to exemplary embodiments, the photocurable pressure-sensitive composition may be photocured at a wavelength in a range of 362 to 420 nm and an illuminance in a range of 100 to 1000 mW/$cm^2$, and may be completely cured at a curing rate in a range of 99% to 100% upon irradiation with a light intensity of 3,000 mJ/$cm^2$ or more.

According to exemplary embodiments, the pressure-sensitive adhesive layer may have a thickness in a range of 150 to 250 m.

According to exemplary embodiments, the pressure-sensitive adhesive layer may have a transmittance in a range of 95% to 99% and a refractive index in a range of 1.47 to 1.52.

According to exemplary embodiments, the pressure-sensitive adhesive layer may have a Y.I. and haze value of 1.0 or less as measured after being allowed to stand at 120° C. for 500 hours.

According to exemplary embodiments, the pressure-sensitive adhesive layer may have a Y.I. and haze value of 1.0 or less as measured in a test in which 500 cycles are performed with 40° C. for 30 minutes and 80° C. for 30 minutes as one cycle. According to exemplary embodiments, the pressure-sensitive adhesive layer may have a Y.I. and haze value of 1.0 or less as measured after being allowed to stand at a temperature of 85° C. and a humidity of 85% for 500 hours.

According to exemplary embodiments, the pressure-sensitive adhesive layer is outfolded at an angle of 1800 and is maintained without deformation and lifting phenomena in a bending test performed 500,000 times at a radius of curvature of 4R and 2 seconds per cycle.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

The FIGURE is a set of photographs showing the results of heat resistance, moisture resistance, thermal shock and heat cycle tests of the pressure-sensitive adhesive compositions according to exemplary embodiments of the present invention.

DETAILED DESCRIPTION OF EXEMPLARY EMBODIMENTS

Hereinafter, the present invention will be described in more detail through examples and drawings. However, the following examples are presented by way of example to aid understanding of the present invention, and the scope of the present invention is not limited thereto. It is to be understood that the present invention can be modified and implemented in various forms, and includes all modifications, equivalents or alternatives falling within the spirit and scope of the present invention.

The terms used in the present application are used only to describe specific embodiments, and are not intended to limit the present invention. Singular expressions include plural expressions unless the context clearly indicates otherwise. In the present application, the term "include" or "have" is intended to indicate the presence of a characteristic, number, step, operation, constituent element, part or any combination thereof described in the specification, but it should be understood that the possibility of the presence or addition of one or more other characteristics or numbers, steps, operations, constituent elements, parts or any combination thereof is not precluded.

Unless defined otherwise, all terms used herein, including technical or scientific terms, have the same meaning as commonly understood by a person with ordinary skill in the art to which the present invention pertains. Terms such as those defined in commonly used dictionaries should be interpreted as having a meaning consistent with the meaning in the context of the relevant art and should not be interpreted as ideal or overly formal in meaning unless explicitly defined in the present application.

A photocurable pressure-sensitive adhesive composition for electrical components with a 3D structure according to exemplary embodiments of the present invention may include 40 to 55 wt % of a urethane acrylate oligomer, 30 to 44 wt % of an acrylate monomer, 2 to 5 wt % of a photoinitiator, 0.2 to 2 wt % of a silane coupling agent, 0.1 to 1 wt % of a light stabilizer, 0.1 to 1 wt % of an ultraviolet absorber and 0.1 to 1 wt % of an antioxidant.

The composition has a viscosity preferably in a range of 100 to 3,000 cPs. Viscosity is measured at 20 RPM and 25° C. using a HAAKE viscometer manufactured by MCIK. When the viscosity of the composition is less than 100 cPs, water leakage may occur at the nozzle, making it difficult to control the process, and when the viscosity exceeds 3,000 cPs, the nozzle may be clogged due to high viscosity, making it difficult to inject a module.

A reactive oligomer of the functional pressure-sensitive adhesive composition is a urethane acrylate oligomer, and may have two or more functional groups using polyol, isocyanate, and hydroxyacrylate. In addition, the urethane acrylate oligomer may have a number average molecular weight in a range of 6,000 to 50,000, preferably 8,000 or more and less than 20,000.

When the number average molecular weight of the urethane acrylate oligomer exceeds the above range, the viscosity of the pressure-sensitive adhesive composition may be 3,000 or more due to the high molecular weight, which may cause nozzle clogging, and accordingly, it may be difficult to inject a module. Furthermore, Y.I may exceed 1.0 at QUV and high temperature or high temperature, and deformation and lifting of samples may occur in bending resistance tests.

The acrylate monomer may be, for example, one or more selected from the group consisting of isobornyl acrylate, 2-hydroxyethyl acrylate, 2-(2-ethoxyethoxy)ethyl acrylate, pentaerythritol tetraacrylate, trimethylolpropane triacrylate and 1,6-hexanediol diacrylate, but is not particularly limited thereto.

The photoinitiator may be one or more selected from the group consisting of 2-hydroxy-2-methyl-1-phenyl-1-propanone, phosphine oxide, phenylbis(2,4,6-trimethylbenzoyl), 4,4'-bis(diethylamino)benzophenone and diphenyl(2,4,6-trimethylbenzoyl)-phosphine oxide, but is not particularly limited thereto.

The silane coupling agent may be one or more selected from the group consisting of vinyltriethoxysilane, methacryloxypropyltrimethoxysilane, aminopropyltriethoxysilane, and mercaptopropyltrimethoxysilane, but is not particularly limited thereto.

The light stabilizer may be one or more selected from the group consisting of consisting of bis(1,2,2,6,6-pentamethyl-4-piperidyl) sebacate, methyl 1,2,2,6,6-pentamethyl-4-piperidyl sebacate, and tetramethylpiperidine, but is not particularly limited thereto.

A hydroxybenzophenone-based or benzotriazole-based compound can be used as the ultraviolet absorber, and for example, the ultraviolet absorber may be one or more selected from the group consisting of 3-(2H-benzotriazolyl)-5-(1,1-dimethylethyl)-4-hydroxy-benzenepropanoic acid octyl ester and b-[3-(2-H-benzotriazol-2-yl)-4-hydroxy-5-tert-butylphenyl]-propionic acid poly(ethylene glycol) 300-ester, but is not particularly limited thereto.

The antioxidant may be one or more selected from the group consisting of bis(2,6-diisopropylphenyl)carbodiimide, poly-(1,3,5-triisopropylphenylene-2,4-carbodiimide), octadecyl-3-[3,5-di-tert-butyl-4-hydroxyphenyl]propionate, and 2-methyl-4,6-bis(octylsulfanylmethyl)phenol, but is not particularly limited thereto.

Embodiments provide an electrical component with a 3D structure including a pressure-sensitive adhesive layer obtained by photocuring the composition. The pressure-sensitive adhesive layer may have a thickness in a range of 150 to 250 m.

The pressure-sensitive adhesive composition can be completely cured by a metal halide UV curing machine. The curing machine may have a wavelength of 365 to 420 nm and an illuminance of 100 to 1,000 mW/cm$^2$, and can completely cure the pressure-sensitive adhesive composition during irradiation with a light intensity of 3,000 mJ/cm$^2$ or more. Curing means complete curing when the curing rate is 90% to 100%.

The photocured pressure-sensitive adhesive layer has a transmittance of 95% to 99% and a refractive index of 1.47 to 1.52. A sample of a pressure-sensitive adhesive layer for transmittance measurement may be cured by applying a pressure-sensitive adhesive to a thickness of 200 am on glass and then irradiating the glass with a light intensity of 3,000 mJ/cm$^2$ using a metal halide UV curing machine. The transmittance was measured by a UV-Vis spectrophotometer manufactured by the Shimadzu Corporation, and then confirmed as a transmittance at 550 nm.

For a sample of a pressure-sensitive adhesive layer for refractive index measurement, a dam is made with a 200-μm thick tape on both sides of a release film, a pressure-sensitive adhesive is applied between the tapes, and then the dam may be covered with another release film to adjust the thickness of the applied pressure-sensitive adhesive to 200 m. After irradiation with a light intensity of 3,000 mJ/cm$^2$ using a metal halide, the release film may be removed to produce a film in which the pressure-sensitive adhesive is cured. The cured film may be cut into a width of 15 to 20 mm and a length of 30 to 35 mm and measured with an Abbe refractometer manufactured by ATAGO Co., Ltd.

The pressure-sensitive adhesive composition according to the present invention has transparency before and after curing, and maintains transparency even when allowed to stand for 500 hours in an environmental reliability evaluation such as high temperature, constant temperature and constant humidity, thermal shock and QUV. It can be said that the pressure-sensitive adhesive is transparent when the turbidity (HAZE) and yellowness (Y.I, Yellow Index) value before and after environmental reliability evaluation is 1.0 or less.

The pressure-sensitive adhesive layer has a Y.I. and haze value of 1.0 or less after being allowed to stand at 120° C. for 500 hours, and the Y.I. and haze value is also 1.0 or less in a test performed for 500 cycles with 40° C. for 30 minutes and 80° C. for 30 minutes as one cycle. Further, the pressure-sensitive adhesive layer also has a Y.I. and haze value of 1.0 or less as measured after being allowed to stand at a temperature of 85° C. and a humidity of 85% for 500 hours.

The 180 degree peel strength is 0.5 to 2 N/cm and was measured at a speed of 300 mm/min using a universal testing machine manufactured by LLOYD Instruments. Samples have a thickness of 150 to 250 m and a width of 2.0 to 2.5 cm, and may also be PC/pressure-sensitive adhesive layer/PET or glass/pressure-sensitive adhesive layer/PI. The pressure-sensitive adhesive layer according to exemplary embodiments is characterized by being outfolded at an angle of 180° and being maintained without deformation and lifting phenomena in a bending test performed 500,000 times at a radius of curvature of 4R and 2 seconds per cycle.

EXAMPLES

In order to develop a functional pressure-sensitive/adhesive composition with heat resistance characteristics and bending resistance characteristics, the composition was prepared by the following experimental method with the components and contents shown in the following [Table 1] and [Table 2].

Experimental Method

The monomers, photoinitiators and additives were weighed according to the components and contents shown in [Table 1], and then stirred at 500 RPM for 10 cycles using a paste mixer to dissolve the photoinitiators and additives. After dissolution was confirmed, the oligomer was added in the contents shown in the following [Table 1] and [Table 2], and then mixed at 500 RPM for 5 cycles.

TABLE 1

| Classification | Example 1 (units: wt %) | Example 2 (units: wt %) |
|---|---|---|
| Urethane acrylate oligomer (molecular weight: 8,000) | 53 | 53 |
| Urethane acrylate oligomer (molecular weight: 20,000) | — | — |
| Urethane acrylate oligomer (molecular weight: 40,000) | — | — |
| Acrylate Monomer 1 | 29.7 | 22.7 |
| Acrylate Monomer 2 | 3 | 3 |
| Acrylate Monomer 3 | 10 | 10 |
| Acrylate Monomer 4 | 1.05 | 1.05 |
| Acrylate Monomer 5 | — | 7 |
| Diphenyl(2,4,6-trimethylbenzoyl)phosphine oxide | 2.2 | 2.2 |
| Vinyltriethoxysilane | 0.25 | 0.25 |
| Bis(1,2,2,6,6-pentamethyl-4-piperidyl)sebacate | 0.2 | 0.2 |
| 3-(2H-Benzotriazoly1)-5-(1,1-dimethylethyl)-4-hydroxy-benzenepropanoic acid octyl ester | 0.2 | 0.2 |
| Bis(2,6-diisopropylphenyl)carbodiimide | 0.2 | 0.2 |
| 2-Methyl-4,6-bis(octylsulfanylmethyl)phenol | 0.2 | 0.2 |

TABLE 2

| Classification | Comparative Example 1 (wt %) | Comparative Example 2 (wt %) | Comparative Example 3 (wt %) | Comparative Example 4 (wt %) | Comparative Example 5 (wt %) | Comparative Example 6 (wt %) |
|---|---|---|---|---|---|---|
| Urethane acrylate oligomer (molecular weight: 8,000) | — | — | — | — | — | — |
| Urethane acrylate oligomer (molecular weight: 20,000) | 53 | 53 | 53 | 53 | 53 | — |
| Urethane acrylate oligomer (molecular weight: 40,000) | — | — | — | — | — | 53 |
| Acrylate Monomer 1 | 30.1 | 30.1 | 30.3 | 30.1 | 29.7 | 29.7 |
| Acrylate Monomer 2 | 3 | 3 | 3 | 3 | 3 | 3 |
| Acrylate Monomer 3 | 10 | 10 | 10 | 10 | 10 | 10 |
| Acrylate Monomer 4 | 1.05 | 1.05 | 1.05 | 1.05 | 1.05 | 1.05 |
| Acrylate Monomer 5 | — | — | — | — | — | — |

TABLE 2-continued

| Classification | Comparative Example 1 (wt %) | Comparative Example 2 (wt %) | Comparative Example 3 (wt %) | Comparative Example 4 (wt %) | Comparative Example 5 (wt %) | Comparative Example 6 (wt %) |
|---|---|---|---|---|---|---|
| Diphenyl(2,4,6-trimethylbenzoyl)phosphine oxide | 2.2 | 2.2 | 2.2 | 2.2 | 2.2 | 2.2 |
| Vinyltriethoxysilane | 0.25 | 0.25 | 0.25 | 0.25 | 0.25 | 0.25 |
| Bis(1,2,2,6,6-pentamethyl-4-piperidyl)sebacate | 0.1 | 0.1 | 0.1 | 0.2 | 0.2 | 0.2 |
| 3-(2H-Benzotriazolyl)-5-(1,1-dimethylethyl)-4-hydroxy-benzenepropanoic acid octyl ester | 0.1 | 0.1 | 0.1 | 0.2 | 0.2 | 0.2 |
| Bis(2,6-diisopropylphenyl)carbodiimide | 0.2 | — | — | — | 0.2 | 0.2 |
| 2-Methyl-4,6-bis(octylsulfanylmethyl)phenol | — | 0.2 | — | — | 0.2 | 0.2 |

Test Examples

In order to examine the bending resistance, heat resistance, and environmental resistance of the functional pressure-sensitive adhesive compositions prepared in the Examples and Comparative Examples, samples and environmental tests were performed by the following methods.

A sample for evaluating the bending resistance of a functional pressure-sensitive adhesive composition was prepared by the following method. The sample was photocured by applying a pressure-sensitive adhesive to a thickness of 25 to 50 m onto a PET film having a thickness of 25 to 50 m using an automatic bar coater, and then irradiating the PET film with a light intensity of 3,000 mJ/cm$^2$ using a metal halide. The cured sample was cut into a width of 150 mm and a length of 85 mm, and then subjected to a bending resistance test by mounting the sample on bending tester equipment manufactured by manufactured by FlexiGO Co., Ltd. For the test, bending evaluation was performed 500,000 times at a radius of curvature of 4R and 2 seconds per cycle by outfolding the sample, and then visually confirming the deformation and lifting of the sample.

In addition, in order to evaluate the heat resistance and environmental resistance of the pressure-sensitive adhesive, a sample was prepared by the following method to measure HAZE and YI, and then was subjected to thermal shock, constant temperature and constant humidity, QUV and high temperature for 500 hours to compare the HAZE and YI before and after the being subjected thereto.

After a wide slide glass (76*52*1.3 mm) was washed with acetone or IPA, a 200-μm tape was attached onto both sides of the sample to create a gap. After the pressure-sensitive adhesive composition was applied between the sides of the gap, the thickness of the pressure-sensitive adhesive was adjusted to 200 μm by covering the sample with another wide slide glass so as not to generate bubbles. The sample was cured by being irradiated with a light intensity of 3,000 mJ/cm$^2$ using a metal halide. The cured sample was measured for HAZE and Y.I using a spectrophotometer manufactured by Minolta Co., Ltd. In this case, before the heat resistance and environment resistance test, the HAZE is 0.1 to 0.5, and the Y.I is 0.5 to 0.9.

The prepared samples were subjected to thermal shock, constant temperature and constant humidity, QUV and 120° C. for 500 hours each. In the case of thermal shock, 500 cycles were performed with −40° C. for 30 minutes and 80° C. for 30 minutes as one cycle, and for constant temperature and constant humidity, the sample was allowed to stand at a temperature of 85° C. and a humidity at 85%. For QUV, the sample was irradiated with an illuminance of 40 W at a temperature of 60° C. using a UVB lamp, and for a high temperature test, an evaluation was performed by placing the sample in a drying oven at 120° C. for 500 hours.

After the pressure-sensitive adhesive compositions prepared in the Examples and Comparative Examples were allowed to stand under the above conditions for 500 hours, the HAZE and Y.I measurement results are shown in the following [Table 3] and [Table 4].

TABLE 3

| | | Example 1 | Example 2 |
|---|---|---|---|
| Thermal shock | HAZE | 0.44 | 0.13 |
| | YI | 0.48 | 0.61 |
| Constant temperature and constant humidity | HAZE | 0.35 | 0.19 |
| | YI | 0.53 | 0.48 |
| QUV | HAZE | 0.37 | 0.17 |
| | YI | 0.46 | 0.51 |
| High temperature | HAZE | 0.12 | 0.07 |
| | YI | 0.62 | 0.46 |
| Bending resistance | | ○ | ○ |

TABLE 4

| | | Comparative Example 1 | Comparative Example 2 | Comparative Example 3 | Comparative Example 4 | Comparative Example 5 | Comparative Example 6 |
|---|---|---|---|---|---|---|---|
| Thermal shock | HAZE | 0.16 | 0.16 | 0.27 | 0.33 | 0.66 | 0.72 |
| | YI | 0.53 | 0.35 | 0.4 | 0.56 | 0.26 | 0.64 |
| Constant temperature and constant humidity | HAZE | 0.64 | 0.37 | 0.42 | 0.25 | 0.69 | 1.04 |
| | YI | 0.38 | 0.26 | 0.35 | 0.3 | 0.64 | 0.22 |

TABLE 4-continued

| | | Comparative Example 1 | Comparative Example 2 | Comparative Example 3 | Comparative Example 4 | Comparative Example 5 | Comparative Example 6 |
|---|---|---|---|---|---|---|---|
| QUV | HAZE | 0.46 | 0.29 | 0.49 | 0.27 | 0.75 | 0.82 |
| | YI | 1.18 | 1.13 | 1.2 | 0.47 | 0.54 | 0.47 |
| High | HAZE | 0.23 | 0.19 | 0.22 | 0.17 | 0.25 | 0.97 |
| temperature | YI | 1.39 | 1.64 | 1.26 | 1.3 | 0.48 | 0.66 |
| Bending resistance | | X | X | X | X | X | X |

Referring to [Table 3], in the case of Examples 1 and 2, in which 53 wt % of a urethane acrylate oligomer having a molecular weight of 8,000 was mixed with 0.2 wt of each of two antioxidants, a light stabilizer, and an ultraviolet absorber, thermal shock, constant temperature and constant humidity, it was revealed that Haze and Y.I were 1.0 or less even when the samples were exposed to thermal shock, constant temperature and constant humidity, QUV and high temperature for 500 hours, indicating that transparency was maintained. Furthermore, the sample was maintained without deformation or lifting in the bending resistance test of 500,000 times. Further, the sample has a low viscosity of 800 cPs and is easily injected into modules.

In contrast, in the case of Comparative Examples 1, 2, 3, and 4, 53 wt % of a urethane acrylate oligomer having a molecular weight of 20,000 was mixed with a light stabilizer, an ultraviolet absorber, and an antioxidant according to the contents shown in Table 1. As a result of the test, it was confirmed that transparency was maintained with a HAZE and Y.I of 1.0 or less when the sample was allowed to stand for 500 hours of thermal shock and constant temperature and constant humidity, but the Y.I exceeded 1.0 at QUV and high temperature or high temperature. In addition, deformation and lifting of the sample was confirmed in a bending resistance test, and it was confirmed that due to the high molecular weight of 20,000, the viscosity of the adhesive composition was 3,000 to 4,000 cPs, and thus there were difficulties in module injection due to nozzle clogging.

In the case of Comparative Example 5, transparency was maintained in an environmental resistance experiment, but deformation and lifting of the sample were confirmed in a bending resistance test.

Sample Unit Verification

In order to confirm the applicability of the pressure-sensitive adhesive compositions prepared according to the Examples to the interior of automobiles, sample unit reliability verification was performed. HKMC and GM Spec. standard MS reliability verification was performed, and the results are summarized in the following [Table 5] and [Table 6].

TABLE 5

| Classification (MS and malicious verification) | | Initial | Heat resistance 1 105° C. 168 Hr | Heat resistance 2 110° C. Hr | Heat resistance 3 120° C. Hr |
|---|---|---|---|---|---|
| Development material applicable sample | Color difference (ΔE) | — | 0.4 | 0.8 | 1.4 |
| | Transmittance (%) | 88.1 | 87.8 | 87.7 | 87.8 |
| | Appearance | — | No abnormalities | No abnormalities | No abnormalities |
| | Results | — | OK | OK | OK |

TABLE 6

| Classification | | Initial | Moisture resistance | GM Moisture Resistance 1 | GM Moisture Resistance 2 | GM |
|---|---|---|---|---|---|---|
| (MS and malicious verification) | | | 50° C./95% rh/ 168 Hr | 40° C./95% rh/ 168 Hr | 65° C./90% rh/ 240 Hr | Cycle |
| Development material applicable sample | Color difference (ΔE) | — | 0.1 | 0.3 | 1.3 | 0.2 |
| | Transmittance (%) | 88.1 | 87.9 | 88 | 88.3 | 87.8 |
| | Appearance | — | No abnormalities | No abnormalities | No abnormalities | No abnormalities |
| | Results | — | OK | OK | OK | OK |

In the case of Comparative Example 6, white turbidity occurred in a constant temperature and constant humidity evaluation. Since the reaction rate during photocuring was slow due to the high molecular weight of 40,000, unreacted materials were present and changed by humidity and temperature. Furthermore, deformation and lifting of the sample were confirmed in a bending resistance test, and it was confirmed that the viscosity of the pressure-sensitive adhesive composition was 5,000 to 6,000 cPs, and thus module injection was impossible due to nozzle clogging.

For reliability verification, samples prepared according to the Examples were applied as an optical clear pressure-sensitive/adhesive between optical clear polycarbonates. As a result of the reliability verification, in items before the verification, a value of 2 or less was confirmed in the color difference compared to the sample before reliability, and a change value of 1% or less was also confirmed in transmittance. It could be confirmed that the external appearance was in a state without peeling.

Furthermore, even in the heat resistance verification at a temperature of 120° C., which is assumed to be the maximum temperature inside a vehicle, the color difference was 1.4, satisfying a standard of 2 or less required for application to automobiles, and it was confirmed that there was no peeling phenomenon in appearance, and the value of a decrease in transmittance was also confirmed at a level of 1%.

Module Unit Verification

Module unit verification was performed on the prototype manufactured according to the Examples. In the module unit verification, the prototype was evaluated by selecting the most severe items such as thermal shock, 120 degree heat resistance, moisture resistance, and heat resistance cycle property. As shown in the FIGURE, it could be confirmed that the color difference value was 1 or less when the prototypes were compared before and after the reliability evaluation. Furthermore, it could be confirmed that the changes in the transmittance and haze values as optical performance were within 1%.

The photocurable optical clear pressure-sensitive adhesive composition according to the present invention has excellent durability and bending resistance under conditions of high temperature, high humidity and thermal shock.

Furthermore, the photocurable optical clear adhesive composition according to the present invention has transparency before and after curing of the adhesive of the present invention, and maintains transparency even when allowed to stand for 500 hours in an environmental reliability evaluation such as high temperature, constant temperature and constant humidity, thermal shock and QUV. Further, the transparency is maintained without causing yellowing or discoloration caused by environmental changes.

Specifically, provided is a pressure-sensitive adhesive composition, which has heat resistance at a temperature of 120° C., maintains transparency in various environments such as high temperature, low temperature, high humidity and light resistance, and has stable optical properties of a haze and yellow index (Y.I.) of 1.0 or less.

The photocurable optical clear pressure-sensitive adhesive composition according to the present invention is suitable for application to electrical components having a 3D structure, such as a flexible display for vehicles. Accordingly, it is possible to provide an optical clear pressure-sensitive/adhesive material that can be applied to displays and structures with a three-dimensional structure according to the design trends in the future.

Meanwhile, the effects of the present invention are not limited to those mentioned above, and other effects, which have not been mentioned, will be able to be clearly understood by those skilled in the art from the following description.

What is claimed is:

1. A photocurable pressure-sensitive adhesive composition for electrical components with a 3D structure, comprising:

40 to 55 wt % of a urethane acrylate oligomer, the urethane acrylate oligomer having a number average molecular weight in a range of 6,000 to 8,000, 30 to 44 wt % of an acrylate monomer, 2 to 5 wt % of a photoinitiator, 0.2 to 2 wt % of a silane coupling agent, 0.1 to 1 wt % of a light stabilizer, 0.1 to 1 wt % of an ultraviolet absorber, and 0.1 to 1 wt % of an antioxidant.

2. The photocurable pressure-sensitive adhesive composition of claim 1, wherein the photocurable pressure-sensitive adhesive composition has a viscosity in a range of 100 to 3,000 cPs.

3. The photocurable pressure-sensitive adhesive composition of claim 1, wherein the acrylate monomer is one or more selected from the group consisting of isobornyl acrylate, 2-hydroxyethyl acrylate, 2-(2-ethoxyethoxy)ethyl acrylate, pentaerythritol tetraacrylate, trimethylolpropane triacrylate, and 1,6-hexanediol diacrylate.

4. The photocurable pressure-sensitive adhesive composition of claim 1, wherein the photoinitiator is one or more selected from the group consisting of 2-hydroxy-2-methyl-1-phenyl-1-propanone, phosphine oxide, phenylbis(2,4,6-trimethylbenzoyl), 4,4'-bis(diethylamino)benzophenone, and diphenyl(2,4,6-trimethylbenzoyl)-phosphine oxide.

5. The photocurable pressure-sensitive adhesive composition of claim 1, wherein the silane coupling agent is one or more selected from the group consisting of vinyltriethoxysilane, methacryloxypropyltrimethoxysilane, aminopropyltriethoxysilane, and mercaptopropyltrimethoxysilane.

6. The photocurable pressure-sensitive adhesive composition of claim 1, wherein the light stabilizer is one or more selected from the group consisting of bis(1,2,2,6,6-pentamethyl-4-piperidyl) sebacate, methyl 1,2,2,6,6-pentamethyl-4-piperidyl sebacate, and tetramethylpiperidine.

7. The photocurable pressure-sensitive adhesive composition of claim 1, wherein the ultraviolet absorber is one or more selected from the group consisting of hydroxybenzophenone-based compounds and benzotriazole-based compounds.

8. The photocurable pressure-sensitive adhesive composition of claim 1, wherein the ultraviolet absorber includes a benzotriazole-based compound.

9. The photocurable pressure-sensitive adhesive composition of claim 7, wherein the ultraviolet absorber is one or more selected from the group consisting of 3-(2H-benzotriazolyl)-5-(1,1-dimethylethyl)-4-hydroxy-benzenepropanoic acid octyl ester and b-[3-(2-H-benzotriazol-2-yl)-4-hydroxy-5-tert-butylphenyl]-propionic acid poly(ethylene glycol) 300-ester.

10. The photocurable pressure-sensitive adhesive composition of claim 1, wherein the antioxidant is one or more selected from the group consisting of bis(2,6-diisopropylphenyl) carbodiimide, poly-(1,3,5-triisopropylphenylene-2,4-carbodiimide), octadecyl-3-[3,5-di-tert-butyl-4-hydroxyphenyl]propionate, and 2-methyl-4,6-bis(octylsulfanylmethyl)phenol.

11. An electrical component with a 3D structure comprising a pressure-sensitive adhesive layer including a photocured product of the photocurable pressure-sensitive adhesive composition of claim 1.

12. The electrical component of claim 11, wherein the photocurable pressure-sensitive adhesive composition is photocured at a wavelength in a range of 362 to 420 nm and an illuminance in a range of 100 to 1000 mW/cm$^2$.

13. The electrical component of claim 11, wherein the photocurable pressure-sensitive adhesive composition is photocured at a curing rate in a range of 99% to 100% upon irradiation with a light intensity of 3,000 mJ/cm$^2$ or more.

14. The electrical component of claim 11, wherein the pressure-sensitive adhesive layer has a thickness in a range of 150 to 250 μm.

15. The electrical component of claim 11, wherein the pressure-sensitive adhesive layer has a transmittance in a range of 95% to 99%.

16. The electrical component of claim 11, wherein the pressure-sensitive adhesive layer has a refractive index of 1.47 to 1.52.

17. The electrical component of claim 11, wherein the pressure-sensitive adhesive layer has a Y.I. and haze value of 1.0 or less as measured after being allowed to stand at 120° C. for 500 hours.

18. The electrical component of claim 11, wherein the pressure-sensitive adhesive layer has a Y.I. and haze value of 1.0 or less as measured in a test in which 500 cycles are performed with 40° C. for 30 minutes and 80° C. for 30 minutes as one cycle.

19. The electrical component of claim 11, wherein the pressure-sensitive adhesive layer has a Y.I. and haze value of 1.0 or less as measured after being allowed to stand at a temperature of 85° C. and a humidity of 85% for 500 hours.

20. The electrical component of claim 11, wherein the pressure-sensitive adhesive layer is outfolded at an angle of 180° and is maintained without deformation and lifting phenomena in a bending test performed 500,000 times at a radius of curvature of 4R and 2 seconds per cycle.

* * * * *